Jan. 19, 1960  F. R. IRELAND  2,921,701
MATERIAL HANDLING DEVICE
Filed June 14, 1954  5 Sheets-Sheet 1
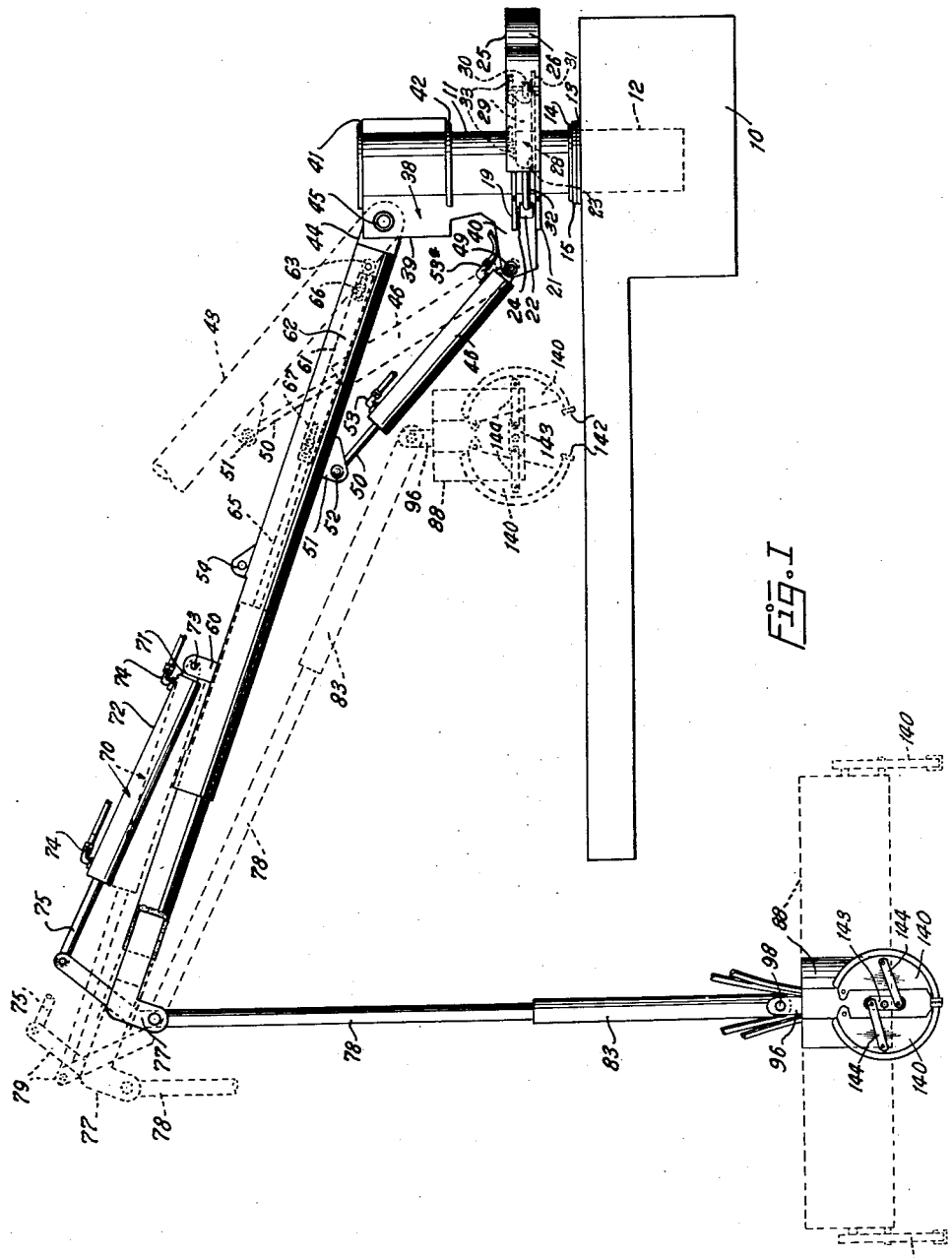
Fig. I
FRANK R. IRELAND
INVENTOR.
BY
ATTORNEYS

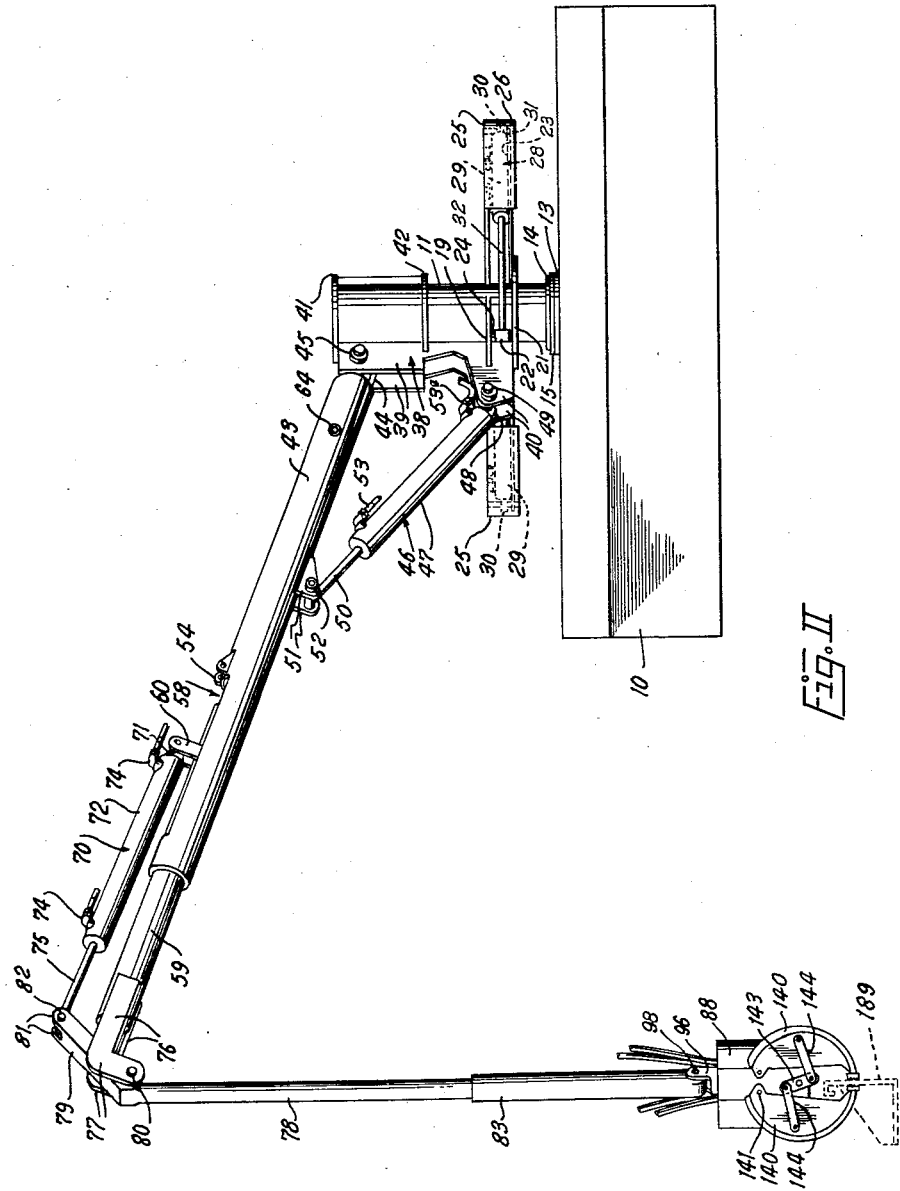

Jan. 19, 1960 F. R. IRELAND 2,921,701
MATERIAL HANDLING DEVICE
Filed June 14, 1954 5 Sheets-Sheet 3
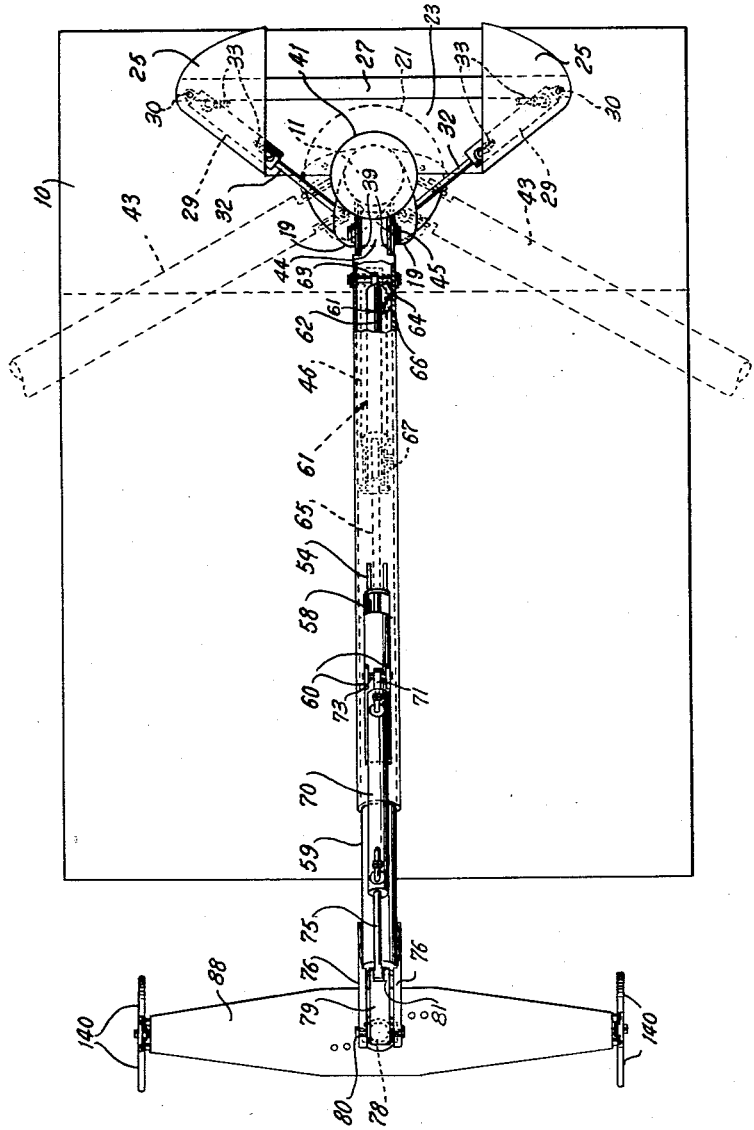
FRANK R. IRELAND
INVENTOR.
BY
ATTORNEYS

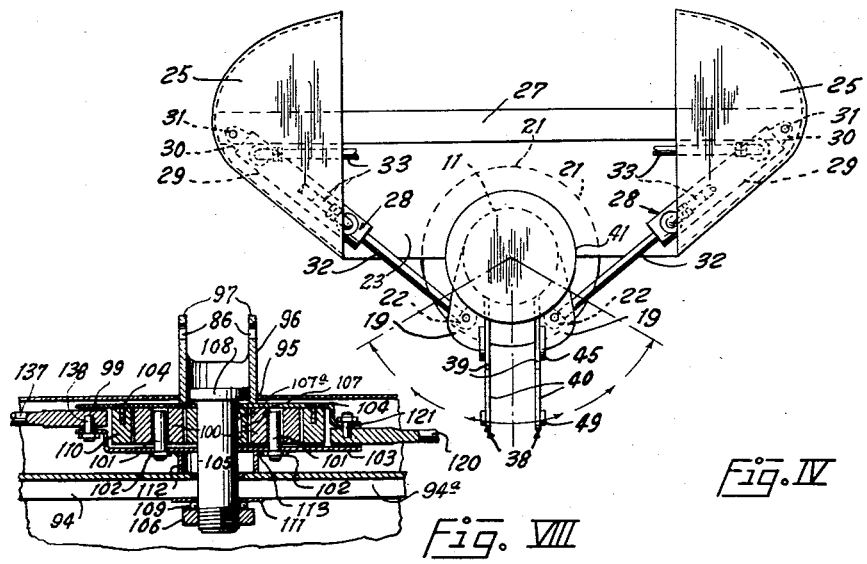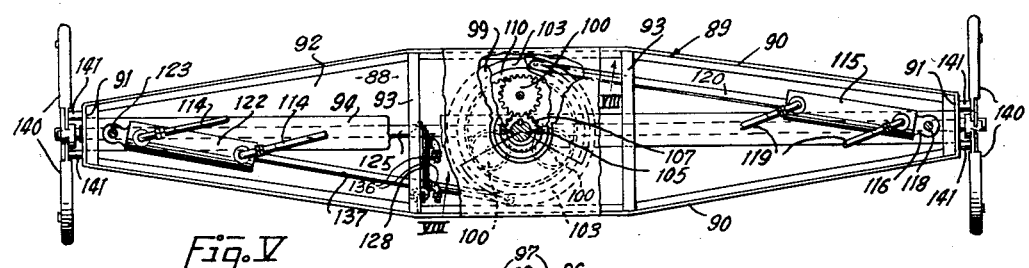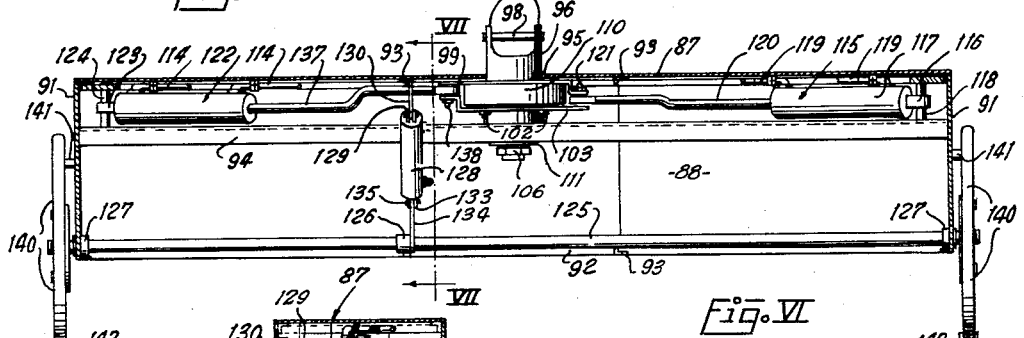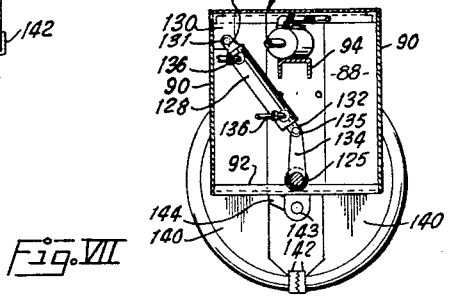
FRANK R. IRELAND
INVENTOR.

Jan. 19, 1960 F. R. IRELAND 2,921,701
MATERIAL HANDLING DEVICE
Filed June 14, 1954 5 Sheets-Sheet 5
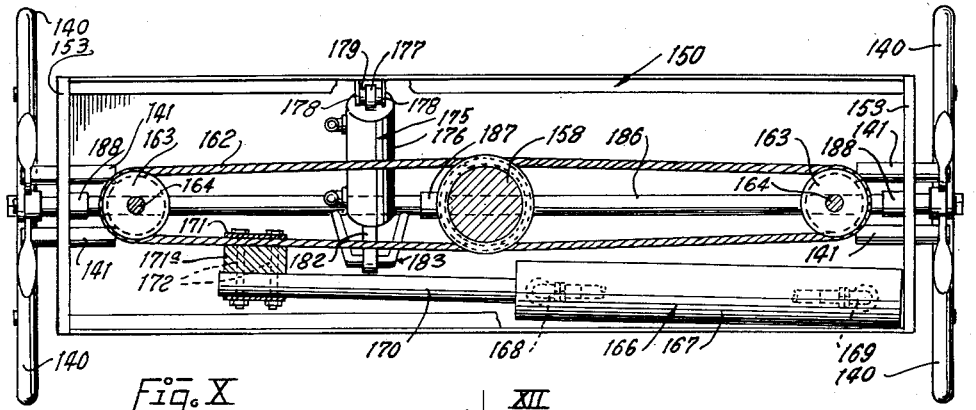
Fig. X
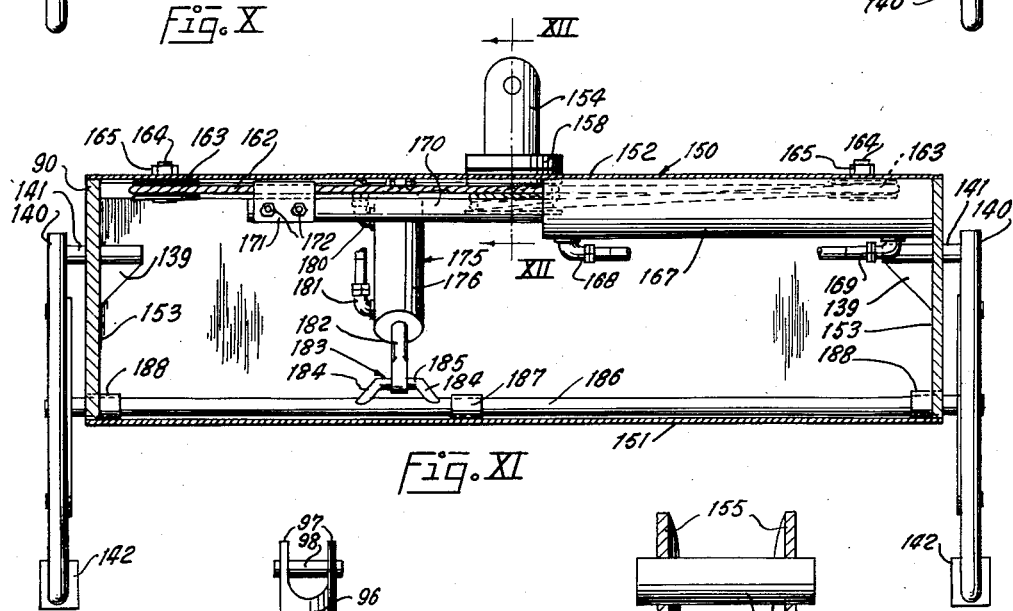
Fig. XI
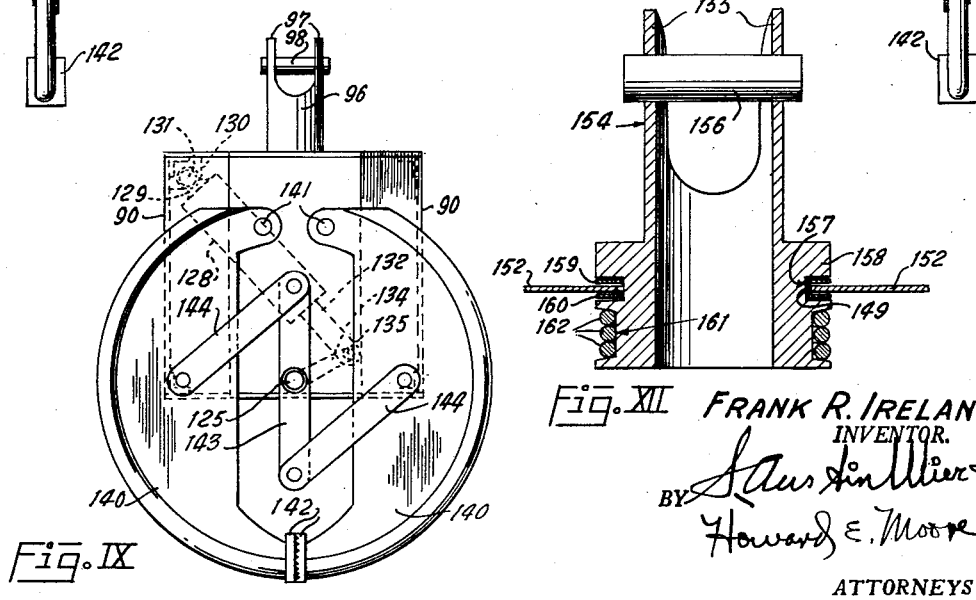
Fig. IX Fig. XII
FRANK R. IRELAND
INVENTOR.
BY
ATTORNEYS

United States Patent Office 2,921,701
Patented Jan. 19, 1960

2,921,701

MATERIAL HANDLING DEVICE

Frank R. Ireland, Dallas, Tex., assignor to Texas Bitulithic Company, Dallas, Tex., a corporation of Texas Application June 14, 1954, Serial No. 436,479

3 Claims. (Cl. 214—147)

This invention is concerned with a material handling device and is particularly concerned with a machine for picking up, moving and depositing material without the necessity of manually handling same.

The machine may be employed to pick up, move and deposit a variety of materials such as steel beams, crates, bales, forms, etc.

The machine is particularly useful to lift, load, unload and place metal forms used in the laying of concrete, but it is to be understood that it is not limited to such use.

In the use of such machine for handling concrete laying forms it has been found to be highly successful from the standpoint of safety, economy, preservation of forms, and savings in labor and material.

Prior to the advent of this invention it normally required five or six men to load such forms on a truck. The machine disclosed herein is operated by one man and does not require the assistance of other men for the lifting, manipulating and placing of forms in a desired plate. Thus, the savings in labor is reduced by the ratio of five or six to one.

It has heretofore been the practice in loading concrete laying forms for men to pick up the forms from the ground and pitch them onto a truck. In unloading such forms it has been the practice to slide the forms off the truck and allow them to drop three or four feet to the ground, sometimes striking other forms. These procedures are very damaging to the forms, bending them, and knocking off the form locks and stake pockets, which are necessary to the setting up and operation of the forms.

The above recited procedure for loading and unloading forms has also been disadvantageous from the standpoint of safety to personnel. Forms often fall upon the hands and feet of workmen. The forms are quite heavy and back strains often result in the hoisting for loading and placing such forms.

The machine disclosed herein picks up the forms and gently deposits them at the desired plate, eliminating the damage heretofore inflicted on the forms by dropping them and banging them against other forms or equipment. The operator of the machine is at a remote position from the pick up and deposit point for the forms, and no other workman need be close by, so that it eliminates entirely injury to personnel.

It is therefor advantageous, not only from the standpoint of savings in medical and compensation insurance costs by employers using such machine, but it is advantageous from a humanitarian standpoint, in that it prevents injury and suffering to employees and reduces the loss of time by personnel as a result of injuries.

It is therefore a primary object of this invention to provide a machine for picking up, moving and depositing material with safety, economy and speed.

Another object of this invention is to provide a machine for picking up, moving and placing material which will accurately pick up and place the material at any desired spot without manual handling of the material.

A still further object of this invention is to provide a machine which is operable to cover a wide area radiating from its base in the picking up, moving and depositing of material.

A further object of this invention is to provide, in a material handling machine a maneuverable and controllable boom having on its free end a maneuverable hook-box assembly, which box assembly is maintained in a horizontal position with relation to the ground, and may be rotated to cover a horizontal plane of 360 degrees, and having material grasping hooks on the outer ends thereof, with power means contained within the box for rotating the box and for opening and closing the hooks.

An additional object of this invention is to provide, in a material handling machine, a maneuverable and controllable boom arm having an offset dog-leg portion thereon which allows the boom arm to be swung to a position parallel with the extensible boom to which it is pivoted, so that the free end thereof, carrying the maneuverable hook box, may be placed immediately adjacent the base for the machine.

Another object of this invention is to provide, in a material handling machine, an anchor post assembly including a pair of synchronized hydraulic rams, pivoted thereto, for arcuately rotating the anchor post, carrying with it the main boom which is pivoted to the anchor post assembly, and also having a hydraulic ram attached to the anchor post between the post and the main boom to elevate and lower the latter.

A still further object of this invention is to provide, in a material handling machine, an extensible boom member telescopically slidable with relation to a pivoted boom member, the main boom having a slot in the upper side thereof through which extends a mounting post for hingedly connecting a hydraulic ram to the extensible boom, thereby preventing rotation of the extensible boom in the pivoted boom and allowing the ram to move with the extensible boom.

Other and further objects of this invention will become apparent upon reading the detailed specification hereinafter following, and by referring to the drawings attached hereto, and forming a part hereof.

In the drawings suitable apparatus is shown for carrying out my invention in which:

Fig. I is a side elevational view of the material handling device.

Fig. II is a perspective view, partially in elevation, of the material handling device.

Fig. III is a top plan view of the material handling device.

Fig. IV is an enlarged top plan view of the rotatable mounting post, showing the operating rams therefor, and the mountings for such rams.

Fig. V is a partially sectionalized top plan view of the preferred form of jaw box assembly, with the top wall removed to show the mechanism therein.

Fig. VI is a sectionalized side elevational view of the preferred form of jaw box assembly shown in Fig. V.

Fig. VII is a cross sectional elevational view taken along the line VII—VII of Fig. VI.

Fig. VIII is a fragmentary cross sectional elevational view taken along the line VIII—VIII of Fig. V.

Fig. IX is an end elevational view of the jaw box showing the pivoted jaws carried thereby, with operative links therefor.

Fig. X is a partially sectionalized top plan view of a modified form of jaw box assembly, with the top wall removed to show the operating mechanism therein.

Fig. XI is a sectionalized side elevational view of the modified form of jaw box assembly shown in Fig. X.

Fig. XII is a fragmentary cross sectional elevational view taken along line XII—XII of Fix. XI.

In the drawings numeral references are employed to designate the various parts shown therein, and like numerals designate like parts throughout the various figures of the drawings.

The numeral 10 indicates a suitable base on which the machine is rotatably mounted. Such base may take different forms. For instance, it might be the bed of a truck, a platform, a flatcar or any other base, either stationary or movable, on which it may be desired to mount the material handling machine for use.

A mounting post 11 is rotatably mounted with respect to the base 10. For this purpose the post 11 may have an extension 12, which extends through the top of the base. The extension 12 may be either free or rotatable in a suitable socket.

Preferably an annular ring or flange 13 is secured to the base 10 about the opening therein through which the mounting post 11 extends. Such flange 13 is for the purpose of providing a rigid member upon which the post 11 may be rotatably supported. A fixed annular flange 14 is provided on the post 11, and a wear ring 15 is interposed about the post 11, between the flange 13 and the flange 14. The ring 15 is preferably made of hard steel or bronze and machined smooth in order to reduce and minimize the frictional wear of the flanges 13 and 14 by rotation of the post 11. Suitable lubricant may also be supplied to the contacting surfaces between the ring 15 and the flanges 13 and 14 to minimize wear.

A wing-like extension 19 is affixed, as by welding, to the post 11, on each side thereof. There is one of such wings 19 arranged on each side of the post 11. An annular flange 21 is affixed about the post 11 and spaced from the wings 19. A bearing block 22 is rotatably mounted and supported between the flange 21 and each wing 19. Each of the bearing blocks 22 has pins 24 attached thereto, and extending from each end thereof. The pins 24 on each bearing block 22 extend through suitably aligned holes in the wings 19 and flange 21, and the pins 24 are rotatable in said holes.

A ram mounting plate 25 is spaced from each side of the post 11, and each of said mounting plates 25 has a downwardly extending skirt 26 on the outer side thereof. A cross-brace 27 extends between the mounting plates 25 and secures them together in fixed relationship. The opposite ends of the cross-brace 27 are affixed to the skirts 26 of the mounting plates 25 near the lower edge of said skirts. A plate 23 is affixed, as by welding, to the upper side of flange 21, to the brace 27 and to skirts 26, so as to form a rigid support between the post 11 and the ram mounting plates 25.

The hydraulic rams 28 are provided for the purpose of rotating the post 11. Each of the hydraulic rams 28 has a hydraulic cylinder 29, and each of such cylinders has an attachment lug 30 on the outer end thereof. A suitable hole is provided in each of the attachment lugs 30, and a pivot pin 31 loosely passes through the hole in each of the lugs 30 and the pins 31 are attached to the cross-brace 27, so that each of the hydraulic rams 28 is hingedly attached to the cross-brace 27 at opposite ends thereof.

The hydraulic rams 28 are double-acting rams, having suitable hydraulic lines 33 communicating with each end of the cylinders 29, and a piston rod 32, which is attached at its inner end to a suitable piston (not shown), movably extends through the outer end of each of the cylinders 29. The outer end of each of the piston rods 32 is secured to one of the bearing blocks 22.

The hydraulic rams 28 are so synchronized, through suitable controls (not shown), that when one of the piston rods 32 is extended, the other piston rod is retracted, so that the hydraulic rams 28 may be so actuated to impart force against the wings 19 and flange 21 in a common direction to thereby rotate the post 11 and move the material handling machine in an arc parallel with the base 10. The plates 25 are carried by the post 11 and are free to move with the post upon rotation thereof.

A mounting bracket 38 is provided for hingedly supporting the main boom 43, and for hingedly supporting the boom lifting ram 46.

A fixed annular cap 41 is provided at the upper end of the post 11, and a fixed annular flange 42 is provided intermediate the ends of the post 11. The mounting bracket 38 is welded, or otherwise rigidly attached, to the post 11 and to the cap 41 and flange 42.

The mounting bracket 38, in part, consists of a pair of spaced-apart ears 39 extending outwardly from the post 11 for the purpose of providing a hinged mounting for the main boom member 43.

The main boom member 43 is preferably tubular and has an attachment lug 44 extending therefrom. The attachment lug 44 is positioned between the ears 39 and a pivot pin 45 pivotally secures the lug 44 between the ears 39, so that the boom member 43 is hingedly attached to the ears 39, permitting the boom to be moved up and down about the pivot pin 45.

A boom lifting ram 46 is hingedly secured between the main boom 43 and the mounting post 11 in the manner which will be hereinafter described.

The lifting ram 46 has a cylinder 47 to the rear of which is secured an attachment lug 48. A pair of spaced-apart ears 40 are provided as a part of the mounting bracket 38, and the attachment lug 48 is pivotally secured between the ears 40 by means of a pivot pin 49, which pivot pin loosely passes through the ears 40 and the lug 48, and pivotally secures these members together. Thus the cylinder 47 is permitted to swing about the pivot pin 49.

The hydraulic lifting ram 46 is a double-acting ram, and has suitable hydraulic lines 53 and 53a communicating with opposite ends thereof. A piston rod 50 movably extends from the outer end of the cylinder 47, and the outer end of said rod 50 is hingedly attached between the spaced lugs 51, on the lower side of the main boom member 43, by means of a pivot pin 52.

It will be seen that upon extension of the rod 50 the boom member 43 may be moved upward about the pivot pin 45, and upon reversal of the movement of the rod 50, the main boom 43 may be moved downward about the pivot pin 45, thereby permitting the raising and lowering of the boom member 43.

A pair of spaced lugs 54, having suitable attachment holes therein, are provided on the upper side of the boom member 43 for the purpose of permitting the attachment thereto of a cable or other lifting device for the purpose of mounting or dismounting the material handling device to or from the base.

An elongated slot 58 is provided through the upper side of the main boom 43, for the purpose which will be described.

An extensible boom member 59, which may be tubular or solid, is slidably carried in the main boom member 43 so that it may telescope with relation to the boom member 43. A pair of spaced-apart posts 60 are secured to the extensible boom 59 and extend upwardly through the slot 58. The post 60 is free to move longitudinally in the slot 58 when the extensible boom member 59 slides with relation to the main boom member 43.

A hydraulic ram 61 is provided for the purpose of slidably moving the extensible boom member 59 in the main boom 43. The ram 61 has a suitable cylinder 62 to the rear end of which is secured an attachment eye 63. A pivot pin 64 freely extends through the eye 63 and through the opposite sides of the main boom 43 to which it is secured, thereby hingedly attaching the cylinder 62 inside of the main boom 43. The ram 61 is double-acting and suitable hydraulic lines 66 and 67 communicate with the opposite ends of the cylinder 62.

A piston rod 65 movably extends through the outer end of the cylinder 62, and the outer end of said rod 65 is secured to the inner end of the extensible boom member 59.

It will be seen that upon withdrawal or extension of the rod 65, the extensible boom member 59 will be caused to move in and out of the main boom member 43, thereby permitting adjustment in extension of the extensible boom member 59.

A hydraulic ram 70 is provided for the purpose of operating and controlling the swinging boom arm 78. An attachment eye 71 is provided on the rear end of the cylinder 72 of ram 70. The eye 71 is pivotally attached between the posts 60 by means of a suitable pivot pin 73 which passes through the eye 71 and is secured to the poses 60. The ram 70 is a double-acting ram, having suitable hydraulic lines 74 communicating with opposite ends of the cylinder 72. A piston rod 75 movably extends through the outer end of the cylinder 72.

A pair of spaced attachment ears 76 are secured to the outer end of the extensible boom 59, such attachment ears 76 having a substantially right angularly disposed offset portion 77 thereon. The swinging boom arm 78, which is preferably solid, has an offset leg portion 79 thereon. A pivot pin 80 is attached to the ends of the offset portion 77 of the ears 76 and freely passes through the offset leg 79, thereby pivotally attaching the swinging boom member 78 between the offset portions 77 of the ears 76.

A pair of spaced lugs 81 are formed on the outer end of the offset leg 79, and a pivot pin 82 hingedly attaches the outer end of the piston rod 75 between the spaced lugs 81. The swinging boom member 78 has an enlarged portion 83 on the lower end thereof for the purpose of providing strength and rigidity thereto. Upon extension and withdrawal of the piston rod 75 the swinging boom member 78 may be swung in an arc about the pivot point 80.

The offset leg 79 permits the swinging boom member 78 to be moved to a substantially parallel position with relation to the main boom member 43 and the extensible boom member 59, as is shown in broken lines in Fig. I, thereby permitting the jaw box 88 or 150 to be placed at a point immediately adjacent the post 11 for the purpose of picking up material.

It will also be noted that the posts 60 perform a dual function. They are slidably engaged with the outer edges of the slot 58 and thereby prevent the rotation of the extensible boom member 59 in the main boom member 43, thus preventing the swinging boom member 78 from swinging from side to side in a pendulum motion. The posts 60 and slot 58, in effect slidably keys the extensible boom member 59 to the main boom member 49 to prevent relative rotation therebetween when they are telescopically moved with relation to each other. The posts 60 also provide a hinged mounting for the hydraulic ram cylinder 72, thereby permitting compensation for the arcuate movement of the outer end of the offset leg 79, upon the inward and outward swinging movement of the boom member 78.

The jaw box 88 is hingedly attached to the lower end of the swinging boom member 78 and is arranged to rotate with respect thereto.

The jaw box 88 is comprised of a general housing 89 which includes the spaced side walls 90, end walls 91, bottom wall 92, and top wall 87. A plurality of transverse braces 93 extend between the side walls 90 and are secured to said walls. A longitudinal brace 94, which is preferably a channel-shaped member, extends between the end walls 91, and the opposite ends of said brace are secured to the end walls.

A circular opening 95 is provided centrally of the top wall 87 and the tubular fitting 96 loosely extends through said opening. The tubular fitting 96 is provided with spaced attachment ears 97, having diametrically opposed holes 86 therethrough. A pivot pin 98 is attached through said holes 86 to freely extend through a hole in the end of the swinging boom 78, so that the fitting 96 is hingedly attached to the swinging boom 78 by said pivot pin. The fitting 96 supports the jaw box 88, in the manner which will be hereinafter described, and the jaw box housing 89 is maintained in a horizontal position parallel to the ground at all times regardless of the angular disposition of the swinging boom member 78, by reason of the hinged connection between the fitting 96 and the swinging boom member 78.

An upper plate 99 is rotatably disposed about the gear mounting shaft 105, and said shaft loosely passes through a concentric opening in said plate. The plate 99 is free to rotate with respect to the fitting 96 and the shaft 105. A ring gear 110, having internal teeth, is secured to the lower side of the plate 99 by means of suitable machine screws 104.

The lower plate 103 is rotatably disposed with respect to the shaft 105, said shaft 105 freely passing through a central opening in the plate 103. A plurality of spaced planetary gears 100 are rotatably disposed on the upper side of the plate 103, the teeth on said gears being arranged to intermesh with the teeth on the ring gear 110 and with the teeth on the central gear 107. Each of the planetary gears 100 is rotatably attached to the plate 103 by means of a shaft 101, which shafts extend through the plate 103, and are secured to the plate by means of the nuts 102 threadedly engaged to the outer ends of said shafts. The gears 100 are rotatable on the shaft 101 so that said gears are rotatable.

The central shaft 105 has a central gear 107 keyed thereto by means of a suitable key 107a, the outer teeth on said gear being arranged to intermesh with the teeth on the planetary gears 100.

An enlarged head 108 is provided on the upper end of the shaft 105, said head being welded or otherwise rigidly attached to the fitting 96, so that the shaft 105 is fixed with relation to fitting 96. The shaft 105 freely extends through the upper face of the longitudinal channel brace 94 and through a plate 111, which plate 111 extends between, and is secured to, the spaced downwardly extending legs 94a of the channel brace 94. A nut 106 is threadedly engaged to the lower end of the shaft 105 and a suitable bearing 109 is engaged between the nut 106 and the plate 111.

The jaw box housing 89 may thus rotate about the shaft 105 on the bearing 109. The entire jaw box assembly 88 is free to rotate with respect to the fixed shaft 105 on the bearing 109.

A tubular spacer member 112 is arranged about the shaft 105 and is secured to the bottom side of the plate 103 by means of welding 113. The lower end of spacer element 112 is slidably disposed with relation to the upper side of horizontal brace 94 so that the brace 94 is free to rotate with respect to the spacer member 112. The spacer element 112 maintains and spaces the plate 103 in upward position on the shaft 105, and thereby maintains the planetary gears in mesh with ring gear 110 and central gear 107.

The hydraulic ram 115 includes a cylinder 117, having a mounting eye 116 attached to the end thereof. A pivot bolt 118 passes through the eye 116 and the opposite ends of said pivot bolt are secured to the upper side of the jaw box housing and to the horizontal brace 94, respectively. The eye 116 is free to rotate with respect to the pin 118, so that ram cylinder 117 is pivotally attached to the jaw box housing. Suitable hydraulic connections 119 are provided for the double-acting ram 115. A movable piston rod 120 extends from the cylinder 117 and said rod is pivotally attached to an offset portion of the upper plate 99 by means of a suitable pivot pin 121.

Another hydraulic ram 122 is provided at the opposite end of the jaw box housing. Said ram 122 has an eye 123 on the outer end thereof and the pivot pin 124 freely passes through said eye, so that the hydraulic ram 122 is pivotally arranged with respect to said pin. The pin 124 is secured at its opposite ends to the upper side of the jaw box housing and to the cross-brace 94, respectively. The ram 122 is also a double-acting ram and has suitable hydraulic connections 114 communicating with each end thereof. A piston rod 137 slidably extends from the ram 122, said rod being pivotally attached to an offset side of the bottom plate 103 by means of a pivot pin 138.

The rams 115 and 122 are so synchronized, through suitable conventional controls (not shown) that the piston rod for one ram is extended in unison with the contraction of the piston rod for the other ram and thereby the plates 99 and 103 may be rotated about shaft 105 in opposite directions. When the plates 99 and 103 are thus rotated in opposite directions, the ring gear 110 rotates the planetary gears 100 as such planetary gears are moved in opposite direction about the inner side of the ring gear, and the teeth of the planetary gears enmesh with the teeth of the central gear 107 as the planetary gears are moved about the central gear. The rams 115 and 122 are hingedly fixed with respect to the jaw box housing, so that the rotative force thus imparted by the action of the rams is applied to the jaw box housing assembly 88, which is caused to rotate about the shaft 105 on the bearing 109.

The strokes of the rams 115 and 122, the circumference of plates 99 and 103, and the ratio of the gears 110, 100 and 107 are so arranged that the jaw box may be caused to rotate by at least 180 degrees in each direction. The direction of rotation of jaw box assembly 88 may be changed by merely reversing the action of the rams 115 and 122 through suitable conventional controls.

A rotatable, jaw operating, shaft 125 extends longitudinally through the jaw box housing 89. The opposite ends of the shaft 125 extend through, and are rotatably supported by, the bearings 127 mounted in the end walls 91 of the housing 89. Another bearing 126 is attached to the bottom wall 92 of the housing, and said bearing 126 rotatably supports the mid-portion of the shaft 125.

A double-acting hydraulic ram 128 is pivotally attached to the bracket 130 by means of a pivot bolt 131. The bracket 130 is secured to the housing 89. The end of the cylinder of hydraulic ram 128 has spaced mounted lugs 129 secured thereon. The lugs 129 straddle the bracket 130 and the pivot bolt 131 loosely passes through a hole in the bracket 130 and is secured at its opposite ends to the spaced mounting lugs 129 to thereby pivotally attach the lugs 129 to the bracket 130.

A movable piston rod 132 extends from the ram 128. Said rod 132 has a bifurcated end 133 thereon which straddles the end of the link 134 and is pivotally attached to said link by means of a pivot pin 135 the opposite ends of which pin are secured to opposite sides of the bifurcated end 133 and the pin 135 loosely passes through the end of the link 134. The opposite end of the link 134 is rigidly secured to the shaft 125, thus forming an eccentric lever arm for rotation of shaft 125.

Suitable hydraulic connections 136 are arranged to communicate with opposite ends of the ram cylinder 128.

It will be seen that the piston rod 132 may be extended by hydraulic force applied to the ram 128 to rotate the shaft 125 through the link 134, the ram 128 being permitted to pivot about the pivot pin 131 as the link 134 arcuately moves.

A pair of jaws 140 are pivotally attached on each outer end of the jaw box housing 89. The upper end of each of the jaws 140 is pivoted to the outer end of the housing by means of the pins 141. The pins 141 extend through the ends of the housing and are secured to the mounting brackets 139 which brackets are secured to the inner sides of the ends of the housing. The outer ends of the pins 141 loosely extend through holes in the upper end of the jaws 140. The pins 141 are thus fixed with relation to the jaw box housing, and the jaws 140 are arranged to rotate about the pins 141. The lower engaging end 142 of each of the jaws 140 is knurled so that when closed about an article to be lifted the ends 142 will be frictionally engaged and gripped therewith. It is to be understood, however, that the ends 142 may take other forms, such as pointed hooks, which may penetrate a bale or crate or other article to be lifted and moved by the machine.

A link 143 is secured at the mid-point thereof to each end of the shaft 125 extending beyond the ends of the jaw box housing, so that the link 143 may rotate with the shaft 125. The arms 144 are pivoted at their inner ends to the outer ends of the links 143, and such arms are pivoted at their outer ends to the jaws 140 (see Fig. IX). It will be understood that the jaws 140, the link 143 and the arms 144 are duplicated at each end of the jaw box housing 89.

It will be seen that upon rotation of the shaft 125 by actuation of the hydraulic ram 128, the link 143 will rotate and thereby move the jaws 140 outward or inward, depending upon the direction of rotation of the shaft 125, the jaws 140 being rotated about the pins 141. Referring to Fig. IX, by way of illustration, the jaws 140 are shown in closed position and the piston rod 132 is shown to be extended. If the piston rod 132 is contracted the shaft 125 will be rotated counter-clockwise, thus rotating the link 143 in the same direction, and the arms 144 will be extended outward, thus opening the jaws 140. Thus the pair of jaws 140 at each end of the jaw box housing may be opened in position to be lowered over an article to be lifted, and thereafter closed about the article by extension of piston rod 132 to engage and grip the article for lifting and moving same.

A modified form of jaw box, indicated generally at 150, is shown in Figs. X, XI and XII, together with modified mechanism for rotating the jaw box and for opening and closing the jaws 140.

The jaw box 150 includes a general housing which comprises a bottom wall 151, a top wall 152 and end walls 153. The upwardly extending tubular fitting 154 is pivotally attachable to the lower end of the swinging boom arm 78 in the same manner as was described above with reference to the tubular fitting 96, employed for such purpose, in the preferred form, described above. Said fitting 154 has a pair of spaced upwardly extending ears 155 thereon, to which are attached the pivot pin 156. The pin 156 may loosely extend through the lower end of the swinging boom arm 78 so that the jaw box housing may be hingedly attached to the arm 78, whereby the jaw box 150 may be maintained in horizontal position regardless of the angular disposition of the arm 78.

The lower end of the fitting 154 is provided with an enlarged portion which constitutes a drum 158. An annular groove 157 is provided in the drum 158. A circular opening 149 is provided centrally of the top wall 152 of the jaw box housing and the edges of such opening extend into the grooves 157. The washer-like bushings 159 and 160 are carried in the groove 157 and are positioned on opposite sides of the edges of the opening 149, and overlap said edges. The upper wall 152 of the jaw box housing is rotatable with respect to the drum 158 and the entire jaw box assembly 150 is rotatably suspended to the drum 158 by means of the above described arrangement. In other words the jaw box housing 150 is free to rotate about the drum 158 in the manner hereinafter described.

An annular cable receiving channel 161 is provided about the drum 158, and the endless cable 162 is wound about said drum in the channel 161.

The idler pulleys 163 are rotatably attached to the top wall 152 of the jaw box housing 150 near the opposite ends thereof. Each of the pulleys 163 rotates about a supporting shaft 164, which shafts extend through the top wall 152 and are secured thereto by means of the nuts 165 which are threaded to the outer ends of the shafts 164.

The double acting hydraulic ram 166 has a cylinder 167 which is rigidly secured to the top and end walls of the jaw box housing 150. Suitable hydraulic connections 168 and 169 communicate with opposite ends of the cylinder 167. A movable piston rod 170 extends from the end of the cylinder 167. The outer end of the piston rod 170 is secured to the cable 162 by means of a cable clamp 171. The parallel legs of the cable clamp 171 extend about the rod 170 and the cable 162, and the bolts 172 extend through the parallel legs of the cable clamp and through the rod 170 and are secured thereto. Cable 162 is clamped in fixed relationship to the rod by the wedge 171a positioned between the parallel legs of the clamp and clamped in gripping engagement with the cable by the tightening of bolts 172.

When the piston rod 170 is extended or contracted it will move the cable 162 about the pulleys 163 as the pulleys are rotated. Since the drum 158 is attached to the swinging boom arm 78 and cannot rotate in a horizontal plane, the rotative force applied by the extension or contraction of the rod 170 will be applied to the jaw box housing 150 through the cylinder 167, and the jaw box housing will be caused to rotate about the drum 158. As the jaw box housing rotates the cable 162 will be wound about the drum 158 in the channel 161. The stroke of the ram 166 is preferably arranged so that the jaw box housing may be caused to rotate by at least 180° in each direction.

The double acting jaw operating ram 175 includes cylinder 176. Attached to the outer end of the cylinder 176 is an attachment eye 177. A bifurcated bracket 178 is attached to the wall 152 of the jaw box housing 150. The eye 177 is inserted between the spaced sides of the bifurcated bracket 178 and a pivot pin 179 is attached between the opposite sides of the bracket 178 and the pin 179 loosely extends through the eye 177. The eye 177 is rotatable about the pin 179 so that the cylinder 176 is thereby hingedly attached to the jaw box housing.

Suitable hydraulic connection 180 and 181 are provided to communicate with opposite ends of the cylinder 176.

A movable piston rod 182 extends from the end of the cylinder 176.

The bracket 183 has spaced legs 184, the outer ends of which are secured to the rotatable jaw operating shaft 186. The horizontal portion 185 of the bracket 183 rotatably extends through a hole in the outer end of the piston rod 183 so that the rod 182 is pivotally attached to the horizontal portion 185 of bracket 183. The bracket 183 thus forms an eccentric lever arm for rotation of shaft 186.

The jaw operating shaft 186 rotatably extends longitudinally through the housing 150 and the outer ends thereof rotatably extend through bearings 188 secured in the end walls 153 of the jaw box housing 150. The shaft 186 also is rotatably supported near its midpoint by means of a bearing 187, which bearing is secured to the bottom wall 151 of the jaw box housing.

The jaws 140, pivotally mounted at each end of the jaw box housing 150, are the same in construction, mounting and operation as the jaws described and shown in connection with the preferred form of jaw box assembly, and shown in detail in Fig. IX.

It will be seen that when the piston rod 182 is extended or contracted, the shaft 186 will be rotated and the jaws 140 will be opened or closed, depending upon the direction of rotation of the shaft 186.

In operating the material handling machine for picking up, moving and placing an article, the mounting post 11 may be rotated by the rams 29 to swing the main boom member 43 horizontally to a proper position to pick up the material to be moved. The boom member 43 may be raised and lowered to a desired level by means of the lifting ram 46. The extensible boom member 59 may be extended or contracted by the ram 61 in order to regulate the reach of the swinging boom arm member 78. It will be noted that as the extensible boom member 59 is moved outward or inward the mounting posts 60 move in the slot 58 and the ram 70 which operates the swinging boom arm 78 is also moved inward or outward, as the case may be. The posts 60 slidably contact the sides of the slot 58 and prevent the extensible boom arm member 59 from rotating in the main boom member 43, thereby preventing the swinging boom arm 78 from moving from side to side in a pendulum-like movement.

The swinging boom arm member 78 may be swung inward and outward by the ram 70, and the offset portion 79 of the swinging boom arm 78 provides knee action which permits such arm to be moved to a position substantially parallel with the main boom 43 so that articles may be picked up or placed at a point near the mounting post 11. The swinging boom arm 78 may also be extended outwardly from the outer end of extensible boom 59.

It will thus be seen that the device may be utilized to pick up and place articles within a wide area radiating from the base thereof.

After the maneuverable boom, comprised of the main boom member 43, the extensible boom member 59 and the swinging boom member 78 are manipulated, as above described, to bring the jaw box assembly 88 or 150 over an article to be picked up, the jaw box, which is maintained in a horizontal position by pivotal attachment to boom arm member 78, may be rotated in the manner hereinbefore described until the jaws 140 are in proper position over the article to engage and pick it up. The jaws may then be opened by the hydraulic rams 128 or 175 in the manner hereinbefore described and the open jaws lowered over the article in position to engage it. The jaws 140 may then be closed about the article by operation of the hydraulic rams 128 or 175 and the article may then be moved to a place of deposit by the rotation of the post 11, and operation of main boom member 43, extensible boom member 59 and the swinging boom member 78, in the manner hereinbefore described.

By way of illustration, the jaws 140 are shown in Fig. II as being engaged with a form 189, such as used in the laying of concrete roads. It is to be understood, however, that the machine may be employed to pick up various types of articles, as hereinbefore indicated. The jaws 140, at each end of the jaw box housing are closed about and engaged with the elongated form 189, intermediate its ends in position to pick up, move and deposit the form at a desired place.

It will be apparent that I have provided a material handling device which may be quickly and easily manipulated to pick up, move and deposit articles of various kinds, and which covers a wide area from its base, without the necessity of moving the machine. A jaw box assembly has been provided which contains mechanism therein whereby the jaw box may be rotated and the jaws thereon may be manipulated to pick up and place articles at exact and predetermined points without the necessity of manually handling said articles. The entire operation of picking up, transporting and placing articles is carried out by a single operator in a remote position, resulting in great savings in labor, time, and expense, and with absolute safety.

It is apparent that other forms for carrying out my invention could be devised and still remain within the scope and spirit of the appended claims.

I claim:

1. In a material handling device, a main boom, an extensible boom telescopically arranged with relation to the main boom; a swinging arm pivotally attached to the outer end of the extensible boom; an offset leg extending upwardly from the swinging arm; an elongated slot in the main boom; a post attached to the extensible boom and movably extending through the slot; and a hydraulic ram pivotally attached between the post and the outer end of said leg.

2. In a material handling device, a boom arm; a housing; a fitting having a part rotatably supporting the housing, said fitting being hingedly attached to the outer end of the arm; means carried in the housing arranged to rotate the housing with respect to the fitting, said means including a pair of plates rotatably supported by the fitting and a separate hydraulic ram pivotally attached between the housing and each of the plates arranged to rotate the plates in opposite directions to apply rotative force to the housing; a pair of cooperating jaws pivotally carried at each end of the housing; a shaft extending longitudinally of the housing and rotatably extending through the ends thereof, the outer ends of the shaft being operably connected to said jaws; and means carried in the housing to rotate the shaft, said means including an eccentric arm on the shaft and a hydraulic ram pivotally connected between the inner side of the housing and the outer end of the arm.

3. The combination called for in claim 2 with the addition of a ring gear secured to one plate; a central gear secured to the fitting; and a plurality of planetary gears rotatably attached to the other plate and being in mesh with the ring gear and the central gear.

References Cited in the file of this patent

UNITED STATES PATENTS

| | | |
|---|---|---|
| 477,621 | Bulmer | June 21, 1892 |
| 2,030,045 | Billings | Feb. 11, 1936 |
| 2,360,740 | Sturdy | Oct. 17, 1944 |
| 2,411,498 | Billings | Nov. 26, 1946 |
| 2,412,845 | Stevens | Dec. 17, 1946 |
| 2,486,479 | Kennedy | Nov. 1, 1949 |
| 2,643,515 | Harsch | June 30, 1953 |
| 2,674,385 | Stauth et al. | Apr. 6, 1954 |
| 2,678,741 | Pilch | May 18, 1954 |
| 2,699,879 | Bertram | Jan. 18, 1955 |
| 2,702,137 | Ives | Feb. 15, 1955 |
| 2,725,996 | Britton | Dec. 6, 1955 |